(12) United States Patent
Lee et al.

(10) Patent No.: US 9,562,180 B2
(45) Date of Patent: *Feb. 7, 2017

(54) ADHESIVES COMPRISING POLY(ISOBUTYLENE) COPOLYMERS COMPRISING PENDENT FREE-RADICALLY POLYMERIZABLE QUATERNARY AMMONIUM SUBSTITUENT

(71) Applicant: 3M INNOVATIVE PROPERTIES COMPANY, St. Paul, MN (US)

(72) Inventors: Hae-Seung Lee, Woodbury, MN (US); Joon Chatterjee, Bloomington, MN (US); Babu N. Gaddam, Woodbury, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 14/354,998

(22) PCT Filed: Jan. 30, 2013

(86) PCT No.: PCT/US2013/023704
§ 371 (c)(1),
(2) Date: Apr. 29, 2014

(87) PCT Pub. No.: WO2013/147989
PCT Pub. Date: Oct. 3, 2013

(65) Prior Publication Data
US 2015/0010752 A1 Jan. 8, 2015

Related U.S. Application Data

(60) Provisional application No. 61/617,257, filed on Mar. 29, 2012.

(51) Int. Cl.
*C09J 151/00* (2006.01)
*C09J 7/02* (2006.01)
*C08F 8/32* (2006.01)
*C09J 123/22* (2006.01)
*C09J 123/36* (2006.01)
*C08K 5/00* (2006.01)
*C08K 5/3492* (2006.01)

(52) U.S. Cl.
CPC .............. *C09J 151/003* (2013.01); *C08F 8/32* (2013.01); *C09J 7/0203* (2013.01); *C09J 123/22* (2013.01); *C09J 123/36* (2013.01); C08K 5/0025 (2013.01); C08K 5/3492 (2013.01); C09J 2451/00 (2013.01); Y10T 428/2809 (2015.01); Y10T 428/2887 (2015.01)

(58) Field of Classification Search
None
See application file for complete search history.

(56) References Cited

U.S. PATENT DOCUMENTS

| 3,850,858 | A | * | 11/1974 | Park | 524/271 |
| 4,181,752 | A | | 1/1980 | Martens | |
| 4,288,575 | A | * | 9/1981 | Gardner | 525/332.3 |
| 4,329,384 | A | | 5/1982 | Vesley | |
| 4,330,590 | A | | 5/1982 | Vesley | |
| 5,376,503 | A | * | 12/1994 | Audett et al. | 430/270.1 |
| 5,459,174 | A | * | 10/1995 | Merrill et al. | 522/35 |
| 5,602,221 | A | | 2/1997 | Bennett | |
| 6,063,838 | A | | 5/2000 | Patnode | |
| 6,630,238 | B2 | | 10/2003 | Hyde | |
| 6,632,522 | B1 | | 10/2003 | Hyde | |
| 8,247,508 | B2 | * | 8/2012 | Takashima et al. | 526/282 |
| 9,242,021 | B2 | | 1/2016 | Singh | |
| 2011/0282009 | A1 | * | 11/2011 | Parent | C08F 8/14 525/326.7 |

FOREIGN PATENT DOCUMENTS

| EP | 0053022 | 6/1982 |
| WO | WO 02/100935 | 12/2002 |
| WO | WO 2006/093702 | 9/2006 |
| WO | WO 2007/087281 | 8/2007 |
| WO | WO 2009/148716 | 12/2009 |
| WO | WO 2009/148722 | 12/2009 |
| WO | WO 2010/083192 | 7/2010 |
| WO | WO 2010/141248 | 12/2010 |
| WO | WO 2010137655 A1 * | 12/2010 |
| WO | WO 2011/017298 | 2/2011 |
| WO | WO 2011/062851 | 5/2011 |
| WO | WO 2011/062852 | 5/2011 |
| WO | WO 2012/044417 | 4/2012 |
| WO | WO 2012/067741 | 5/2012 |
| WO | WO 2012/067902 | 5/2012 |
| WO | WO 2012/074733 | 6/2012 |
| WO | WO 2012/078292 | 6/2012 |
| WO | WO 2012/112303 | 8/2012 |
| WO | WO 2012/177530 | 12/2012 |
| WO | WO 2013/169317 | 11/2013 |
| WO | WO 2013/184368 | 12/2013 |

OTHER PUBLICATIONS

Wakabayashi et al., Bull. Chem. Soc. Jap., vol. 42, pp. 2924-2930 (1969).
International Search Report PCT/US2013/023704; May 8, 2013; 3 pgs.
Patent Search Report CN App. No. 2013800175616; Jan. 27, 2016, 3 pgs.

* cited by examiner

Primary Examiner — Alexandre Ferre

(57) ABSTRACT

Adhesive compositions comprising a copolymer of isobutylene repeat units and alkene repeat units are described. At least a portion of the alkene repeat units are bonded to a pendent nitrogen atom of a quaternary ammonium salt comprising a free-radically polymerizable substituent. The adhesive optionally comprises other components such as tackifier, unfunctionalized polyisobutylene polymer, plasticizer, and combinations thereof.

18 Claims, No Drawings

ADHESIVES COMPRISING POLY(ISOBUTYLENE) COPOLYMERS COMPRISING PENDENT FREE-RADICALLY POLYMERIZABLE QUATERNARY AMMONIUM SUBSTITUENT

CROSS REFERENCE TO RELATED APPLICATIONS

This application is a national stage filing under 35 U.S.C. 371 of PCT/US2013/023704, filed Jan. 30, 2013, which claims priority to U.S. Provisional Application Ser. No. 61/617,257, filed Mar. 29, 2012, the disclosure of which is incorporated by reference in their entirety herein.

BACKGROUND

Polyisobutylene (PIB) has been considered an attractive material for low surface energy (LSE) bonding applications due to its excellent adhering properties on olefin-based thermoplastics. (See for example WO 2011/062852 and WO 2011/062851)

SUMMARY

The present invention describes adhesive compositions comprising a copolymer of isobutylene repeat units and alkene repeat units. At least a portion of the alkene repeat units are bonded to a pendent nitrogen atom of a quaternary ammonium salt comprising a free-radically polymerizable substituent. The adhesive optionally comprises other components such as tackifier, unfunctionalized polyisobutylene polymer, plasticizer, and combinations thereof.

In one embodiment, the copolymer has the general formula:

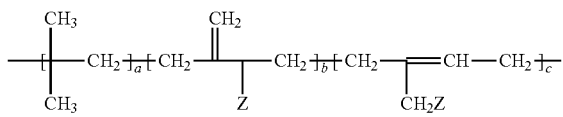

wherein a is at least 20, the sum of b and c is at least one, and Z is a quaternary ammonium salt group comprising a free-radically polymerizable substituent.

DETAILED DESCRIPTION

The invention described herein relates to adhesives and sealants prepared from isobutylene copolymers, and tape articles prepared therefrom. In favored embodiments, the adhesive are pressure-sensitive adhesives.

The adhesive composition comprises a copolymer of isobutylene repeat units and alkene repeat units wherein at least a portion of the alkene repeat units are bonded to a pendent nitrogen atom of a quaternary ammonium group comprising a free-radically polymerizable substituent. In some embodiment, the copolymer itself can be utilized as an adhesive. In other embodiments, the adhesive comprises such isobutylene copolymer is combination with a tackifier, unfunctionalized isobutylene polymer (i.e. copolymer or homopolymer), or a combination thereof.

The copolymer of isobutylene comprises alkene repeat units. As used herein, "alkene" means a linear or branched divalent hydrocarbon having an unsaturation, e.g. isoprene, butene, pentene, hexene, octene and the like. In typical embodiments, the alkene repeat units of the copolymer typically comprise isoprene, butene, or a combination thereof. In some embodiments, the copolymer comprises a copolymer of isobutylene repeat units and isoprene repeat units wherein a portion of the isoprene repeat units are bonded to a pendent nitrogen atom of a quaternary ammonium group comprising a free-radically polymerizable substituent.

As used herein, "free-radically polymerizable" group or substituent refers to ethylenically unsaturated moieties that participate in crosslinking reactions upon expose to a suitable source of free radicals. Free-radically polymerizable groups include for example (meth)acryl groups such as (meth)acrylate and (meth)acrylamide; as well as vinyl (e.g. of an aromatic ring). The free-radically polymerizable group is typically bonded to the nitrogen atom of the quaternary ammonium group by means of a divalent linking group, such as a (e.g. branched or straight-chain) alkylene group. The alkylene linking group typically has at least 2 carbon atoms and no greater than 18 or 12 carbon atoms, such as for example ethylene, propylene, butene, neopentene, hexene, and octene.

In some embodiments, isobutylene and alkene repeat units, such as derived from isoprene or butadiene, are the only repeat units of the copolymer. However, the copolymer may optionally comprise a small concentration of other repeat units, such as repeat units comprising paramethylsytrene, provided that the other repeat units do not detract from the peel and shear properties of the adhesive. Paramethylstyrene monomer units can impart heat resistance and strength to the copolymer by the cohesive force and hardness of paramethylstyrene itself. However, the adhesive compositions described herein exhibit good adhesion in combination with high shear values (10,000 minutes+at room temperature) in the absence of the copolymer comprising paramethylsytrene repeat units.

The copolymer of isobutylene repeat units and alkene repeat units generally comprises a minor concentration of alkene (e.g. isoprene) repeat units bonded to the nitrogen atom of the quaternary ammonium group comprising a free-radically polymerizable substituent. The concentration is greater than 0% by weight and typically at least 1, 2, 3, 4, or 5 wt.-% of the copolymer. The concentration of alkene (e.g. isoprene) repeat units bonded to the nitrogen atom of the quaternary amine group is typically no greater than 20% by weight and in some embodiments no greater than 15, 14, 13, 12, or 10 wt.-%. Since the molecular weight of the free-radically polymerizable substituent is typically about half the molecular weight of the quaternary ammonium group comprising a free-radically polymerizable substituent, the concentration of free-radically polymerizable groups is typically at least 0.5, 1, 1.5, or 2 wt.-% of the isobutylene copolymer and typically no greater than 10, or 7.5, or 7.0, or 6.5, or 6, or 5 wt.-%. A low concentration of free radically polymerizable group is amenable to increasing shear strength via crosslinking, without premature gel formation during (e.g. hot melt) processing.

Repeat unit derived from isoprene bonded to the nitrogen atom of the quaternary amine group can be represented by the following formulas:

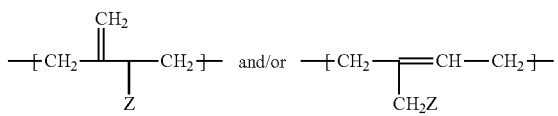

wherein Z is a quaternary ammonium group comprising a free-radically polymerizable substituent.

As depicted in the following reaction schemes, the copolymers are generally prepared by nucleophilic displacement of commercially available halogenated PIBs, including halogenated poly(isobutylene-co-isoprene) with a tertiary amine thereby forming a quaternary ammonium salt wherein the halogen (e.g. bromine) is displaced as a negatively charged counter ion.

Suitable tertiary amine for such nucleophilic displacement include for example 3-(dimethylamino)neopentyl acrylate, 2-(dimethylamino)ethyl methacrylate, N-[3-(dimethylamino)propyl]acrylamide, and vinyl pyridine.

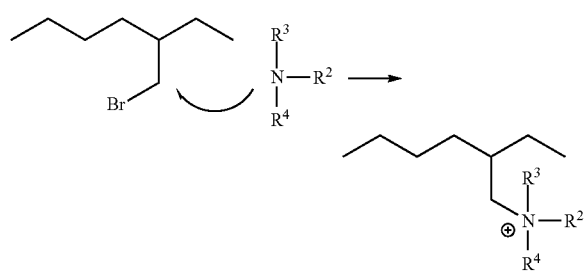

When the copolymer comprises repeat units derived from isoprene the reaction scheme can be depicted as follows:

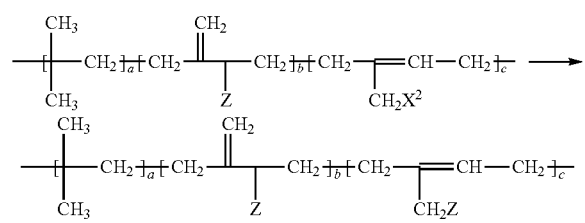

wherein $X^2$ is a halogen, preferably bromine;
Z is a quaternary amine of the formula $-^+(NR^2R^3R^4)(X^2)^-$ or

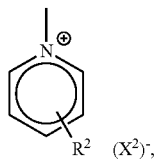

$R^2$ comprises a free-radically polymerizable group;
each of $R^3$ and $R^4$ are independently a $C_1$-$C_{18}$ alkyl;
a is at least 20; and
the sum of b and c is at least one.

It will be recognized that the monomer units having the subscript "a" are polymerized isobutylene monomer units. Further, the subscripts "b" and "c" are chosen such that the copolymer comprises 1 to 20 wt.-% of the respective monomer units, as previously described.

In some embodiments, the tertiary amine that is reacted with the brominated copolymer has the formula $NR^2R^3R^4$; whereas the quaternary ammonium salt group, Z, has the general formula $(NR^2R^3R^4)^+(X^2)^-$.

At least two of the substituents (e.g. $R^3$ and $R^4$) of the tertiary amine and quaternary ammonium salt thus formed are typically independently $C_1$-$C_{18}$ alkyl groups. The alkyl groups may be cyclic ($R^3$ and $R^4$ taken together form a ring), straight-chain, or branched. In some embodiments, $R^3$ and $R^4$ are independently $C_1$-$C_4$, such as methyl groups.

The tertiary amine may be represented by the following formula:

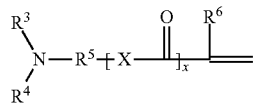

where $R^3$ and $R^4$ are alky groups, as previously described,
X is —O— or —$NR^6$—,
x is 0 or 1,
$R^5$ is alkylene, and
$R^6$ is hydrogen or a $C_1$-$C_4$ alky group.

In other embodiments, such as when vinyl pyridine is utilized as the tertiary amine, the nitrogen atom is part of an aromatic ring structure. Pentavalent nitrogen ring compounds are also considered quaternary ammonium compounds.

Although catalysts or an alkylating agent could be employed, such reaction can simply be initiated by increased temperature (e.g. about 100° C.).

Alternatively, the isobutylene copolymer comprising a pendent quaternary ammonium salt comprising a free-radically polymerizable substituent can be formed by reacting a halogenated, typically brominated, isobutylene copolymer with an amine having a nucleophile (e.g. hydroxylalkyl group) which then can be reacted with an electrophile, such as acryloyl chloride, to convert the hydroxyl to a free radically polymerizable group. Such reactants are depicted as follows:

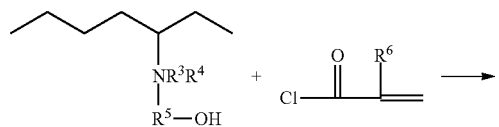

In some embodiments, the starting material for the formation of the isobutylene comprising pendent free-radically polymerizable group is a commercially available brominated copolymer such as available from Lanxess under the trade designation "Lanxess Bromobutyl 2030" (having a bromine content of about 1.5 to 2.0 wt.-% and a molecular weight (Mw) of about 500,000 g/mole). In other embodiments, an unfunctionalized isobutylene copolymer may be halogenated by reacting with N-bromosuccinimide (NBS) or atomic bromine and then subsequently reacted with a tertiary amine compound comprising a free-radically polymerizable substituent. Additionally, unfunctionalized homopolymers and copolymers can be blended with the polyisobutylene copolymer comprising pendent quaternary ammonium salt groups. Thus, unfunctionalized isobutylene copolymers are useful as a starting material. Unfunctionalized polyisobutylene copolymers and homopolymers are also useful as an optional, but additional component of the adhesive composition. Polyisobutylene homopolymers are not useful as a starting material due to lacking unsaturation in the polymer which is needed for halogenation. Such unsaturations are provided by the alkene comonomer repeat units.

The polyisobutylene material is typically prepared by polymerizing isobutylene alone or by polymerizing isobutylene plus additional ethylenically unsaturated monomers, such as isoprene, butadiene, or a combination thereof in the presence of a Lewis Acid catalyst such as aluminum chloride, boron trichloride (with titanium tetrachloride as a co-catalyst), or boron trifluoride. Copolymers are typically random copolymers. However, block copolymers could alternatively be utilized.

In some embodiments, the weight average molecular weight ($M_w$) of the isobutylene copolymer comprising pendent free-radically polymerizable quaternary ammonium group) is at least 25,000 grams per mole, at least 50,000 grams per mole, at least 100,000 grams per mole, or at least 150,000 grams per mole. In some embodiments, the weight average molecular weight is typically no greater than 4,000,000 g/mole or 3,000,000 g/mole, or 2,000,000 g/mole, or 1,000,000 g/mole, or 500,000 g/mole.

The unfunctionalized isobutylene copolymers are generally synthetic rubbers having a polyisobutylene main. In some embodiments, the isobutylene copolymers of isobutylene are synthetic rubbers wherein isobutylene is copolymerized with another monomer. Synthetic rubbers include butyl rubbers which are copolymers of mostly isobutylene with a small amount of alkylene, such as isoprene, for example, butyl rubbers available under the tradenames VISTANEX (Exxon Chemical Co.) and JSR BUTYL (Japan Butyl Co., Ltd.). Synthetic rubbers also include copolymers of mostly isobutylene with n-butene or butadiene. In some embodiments, a mixture of isobutylene homopolymer and butyl rubber may be used, i.e., a first polyisobutylene comprises a homopolymer of isobutylene and the second polyisobutylene comprises butyl rubber, or a first polyisobutylene comprises butyl rubber and a second polyisobutylene comprises a homopolymer of isobutylene.

In some embodiments, the adhesive further comprises an unfunctionalized isobutylene homopolymer in combination with the copolymer of isobutylene repeat units and alkene repeat units wherein a portion of the alkene repeat units are bonded to a pendent nitrogen atom of a quaternary ammonium salt comprising a free-radically polymerizable substituent.

Homopolymers are commercially available, for example, under the trade designation OPPANOL (e.g., OPPANOL B10, B15, B30, B50, B80, B100, B150, and B200) from BASF Corp. (Florham Park, N.J.). These polymers often have a weight average molecular weight ($M_w$) in the range of about 35,000 to 4,000,000 grams per mole. Still other exemplary homopolymers are commercially available from United Chemical Products (UCP) of St. Petersburg, Russia in a wide range of molecular weights. For example, homopolymers commercially available from UCP under the trade designation SDG have a viscosity average molecular weight ($M_v$) in the range of about 35,000 to 65,000 grams per mole. Homopolymers commercially available from UCP under the trade designation EFROLEN have a viscosity average molecular weight ($M_v$) in the range of about 480,000 to about 4,000,000 grams per mole. Homopolymers commercially available from UCP under the trade designation JHY have a viscosity average molecular weight in the range of about 3000 to about 55,000 grams per mole. These homopolymers typically do not have reactive double bonds that form covalent bonds via free-radical polymerization.

When utilized, the concentration of unfunctionalized isobutylene copolymer or homopolymer in the pressure sensitive adhesive composition is typically at least 5 wt. %, or 10 wt.-%, 15 wt.-%. The concentration of unfunctionalized isobutylene copolymer or homopolymer is typically no greater than 50 wt. %, or 45 wt.-%, or 40 wt.-%, or 35 wt.-%.

In other embodiments, the adhesive comprises at least one tackifier. The tackifier can have any suitable softening temperature or softening point. The softening temperature is often less than 200° C., less than 180° C., less than 160° C., less than 150° C., less than 125° C., or less than 120° C. In applications that tend to generate heat, however, the tackifier is often selected to have a softening point of at least 75° C. Such a softening point helps minimize separation of the tackifier from the rest of the adhesive composition when the adhesive composition is subjected to heat such as from an electronic device or component. The softening temperature is often selected to be at least 80° C., at least 85° C., at least 90° C., or at least 95° C. In applications that do not generate heat, however, the tackifier can have a softening point less than 75° C.

Exemplary tackifiers include hydrocarbon resins and hydrogenated hydrocarbon resins, e.g., hydrogenated cycloaliphatic resins, hydrogenated aromatic resins, or combinations thereof. Suitable tackifiers are commercially available and include, e.g., those available under the trade designation ARKON (e.g., ARKON P or ARKON M) from Arakawa Chemical Industries Co., Ltd. (Osaka, Japan); those available under the trade designation ESCOREZ (e.g., ESCOREZ 1315, 1310LC, 1304, 5300, 5320, 5340, 5380, 5400, 5415, 5600, 5615, 5637, and 5690) from Exxon Mobil Corporation, Houston, Tex.; and those available under the trade designation REGALREZ (e.g., REGALREZ 1085, 1094, 1126, 1139, 3102, and 6108) from Eastman Chemical, Kingsport, Tenn.

The concentration of tackifier can vary depending on the intended adhesive composition. In some embodiments, the amount of tackifier is at least 5 wt.-%, 10 wt.-% or 15 wt.-%. The maximum amount of tackifier is typically no greater than 45 wt.-%, or 40 wt.-%, or 35 wt.-%, or 30 wt.-%, or 25 wt.-%. tackifying resin.

Plasticizers may also be used in the adhesive formulation to provide wetting action and/or viscosity control. These plasticizers are well known in the art and may include hydrocarbon oils, liquid or soft tackifiers, including liquid hydrocarbon resins, liquid polyterpenes, liquid poly(isobutylenes) such as Glissopal™, and the like, waxes, and mixtures of oils. A plasticizer may be present in the pressure sensitive adhesive of the present invention in an amount of 1, 2, 3, 4 or 5 wt.-%, and typically no greater than 30, or 25, or 20 or 15, or 10 wt.-% of the adhesive composition.

Those skilled in the art will also know that other additives such as fillers, antioxidants, stabilizers, and colorants may be blended with the adhesive for beneficial properties.

The free-radically polymerizable groups of the pendent quaternary ammonium group can be cured as known in the art. In some favored embodiments, the free-radically polymerizable groups are radiation cured such as by photocuring. In such embodiment, a photoinitiator is typically added to the adhesive composition.

The photocrosslinking agent is a preferably a chromophore-substituted chloro-methyl-s-triazine crosslinking agent. In one embodiment, the crosslinking agent is as described in U.S. Pat. No. 4,330,590 (Vesley), and is of the formula:

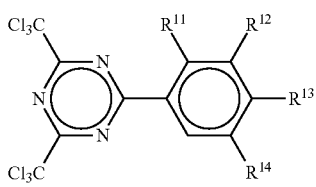

wherein $R^{10}$, $R^{12}$, $R^{13}$, and $R^{14}$ are independently hydrogen, alkyl, or alkoxy; and 1-3 of the $R^{10}$, $R^{12}$, $R^{13}$, and $R^{14}$ groups are hydrogen. Preferably, the alkyl and alkoxy groups have no more than 12 carbon atoms, and often no more than 4 carbon atoms. Preferably, both $R^{12}$ and $R^{13}$ are alkoxy, because this tends to provide shorter reaction times. Adjacent alkoxy substituents may be interconnected to form a ring. The photoactive s-triazine component may be prepared by the co-trimerization of an aryl nitrile with trichloroacetonitrile in the presence of HCl gas and a Lewis acid such as $AlCl_3$, $AlBr_3$, etc., as described in *Bull. Chem. Soc. Japan*, Vol. 42, page 2924 (1969).

In another embodiment, the crosslinking agent is as described in U.S. Pat. No. 4,329,384 (Vesley), and is of the formula:

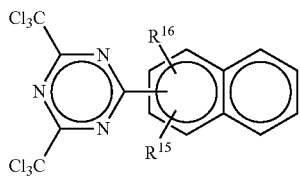

wherein $R^{15}$ and $R^{16}$ are independently hydrogen, alkyl, or alkoxy. By this representation, it is meant that $R^{15}$ and $R^{16}$ can be on either of the fused rings. Preferably, any alkyl or alkoxy group of the photoactive s-triazine component has no more than 12 carbon atoms, and no more than two alkyl and alkoxy groups have more than 6 carbon atoms. In certain embodiments, they have no more than 4 carbon atoms, and the alkyl is often methyl or ethyl, and the alkoxy is often methoxy or ethoxy. Adjacent alkoxy substituents may be interconnected to form a ring. The photoactive s-triazine component may be prepared by the co-trimerization of a polynuclear nitrile with trichloroacetonitrile in the presence of HCl gas and a Lewis acid such as $AlCl_3$, $AlBr_3$, etc. as described in *Bull. Chem. Soc. Jap.*, Vol. 42, pages 2924-2930 (1969).

Examples of suitable chlorinated triazine crosslinking agents include, but are not limited to, 2,4-bis(trichloromethyl)-6-(4-methoxy)phenyl)-s-triazine; 2,4-bis(trichloromethyl)-6-(3,4-dimethoxy)phenyl)-s-triazine; 2,4-bis(trichloromethyl)-6-(3,4,5-trimethoxy)phenyl)-s-triazine; 2,4-bis(trichloromethyl)-6-(2,4-dimethoxy)phenyl)-s-triazine; 2,4-bis(trichloromethyl)-6-(3-methoxy)phenyl)-s-triazine as described in U.S. Pat. No. 4,330,590 (Vesley), and 2,4-bis(trichloromethyl)-6-naphthenyl-s-triazine and 2,4-bis(trichloromethyl)-6-(4-methoxy)naphthenyl-s-triazine as described in U.S. Pat. No. 4,329,384 (Vesley).

The chlorinated triazine crosslinking agent is preferably a photo-crosslinking agent. More preferably, the triazine crosslinking agent is a chromophore-substituted chloromethyl-s-triazine crosslinking agent, which can be prepared according to Wakabayashi et al., *Bull. Chem. Soc. Jap.*, Vol. 42, pages 2924-2930 (1969).

The adhesive compositions comprising an isobutylene copolymer with pendent quaternary amine groups that comprise ethylenically unsaturated free-radically polymerizable groups can be cured using a source of actinic radiation of sufficient energy (i.e., wavelength range) to generate free radicals when incident upon the particular photoactive crosslinking agent selected for use in the composition. The preferable wavelength range for the photoactive crosslinking agents disclosed above is 400 to 250 nm. The radiant energy in this preferred range of wavelengths required to crosslink the adhesive film of the invention is 100 to 1500 millijoules/cm$^2$ and more preferably 200 to 800 millijoules/cm$^2$. Details of the photocure process are disclosed in U.S. Pat. No. 4,181,752 (Martens et al.) and U.S. Pat. No. 4,329,384 (Vesley et al.)

In some embodiments, the adhesive compositions are applied as a solvent solution or dispersion, the solvent evaporated, and the adhesive composition crosslinked on exposure to actinic radiation, such as UV. Crosslinking of such solvent-based compositions may occur before, but preferably occurs after coating and solvent removal. Suitable solvents such as alkanes, ethyl acetate, toluene and tetrahydrofuran are unreactive with the free-radically polymerizable groups of the components of the copolymer.

In other embodiments, such as hot-melt adhesive compositions, the adhesive is applied from the melt as is solvent-free. Hot melt coating a PSA composition eliminates the necessity of solvent processing. To hot melt process an adhesive composition, the composition us typically not crosslinked before and during the coating process. However, to achieve shear adhesion, crosslinking is typically preferred. In hot melt coating processes, this is usually done by exposure to high energy radiation (e.g., E-beam or high intensity ultraviolet radiation). Commonly, when high intensity ultraviolet radiation is used, a photoactive crosslinking species such as benzophenone is added to the composition. Generally, the hot melt adhesive compositions require a narrower range of molecular weights for the poly(isobutylene) copolymer than do solution coated compositions. Too low and the crosslinked polymer has insufficient cohesive strength. Too high and the composition cannot be extrusion coated. Generally, the molecular weight of the unfunctionalized poly(isobutylene) copolymer is from 50,000 to 5,000,000 g/mole. In some embodiments, the molecular weight of the unfunctionalized poly(isobutylene) copolymer is no greater than 1,000,000 g/mole, or 500,000 g/mole, or 400,000 g/mole, or 300,00 g/mole, or 200,000 g/mole or 100,000 g/mole.

In some embodiments, hot melt adhesive compositions are provided which applied to substrates from the melt. Such hot melt adhesive compositions are substantially solvent-free. Hot melt adhesives are versatile and widely used in industrial applications, such as bookbindings, cardboard boxes, plastic parts and wooden articles, among others. Hot melts are generally 100% solid adhesives with application temperatures which vary from about 150 to about 180° C.

In favored embodiments, the (e.g. cured) adhesive is a pressure sensitive adhesive. According to the Pressure- Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted in A. V. Pocius in Adhesion and Adhesives Technology: An Introduction, $2^{nd}$ Ed., Hanser Gardner Publication, Cincinnati, Ohio, 2002. These measurements taken together constitute the balance of properties often used to characterize a PSA.

For example, if the glass transition temperature ($T_g$) or modulus of the elastomer is too high and above the Dahlquist criterion for tack (storage modulus of $3\times10^6$ dynes/cm$^2$ at room temperature and oscillation frequency of 1 Hz), the material will not be tacky and is not useful by itself as a PSA material. Often in this case, low molecular weight, high $T_g$ resin polymers (tackifiers) or low molecular weight, low $T_g$ polymers (plasticizers) are often used to modulate the $T_g$ and modulus into an optimal PSA range.

The adhesives of the present invention may be coated upon a variety of flexible and inflexible backing materials using conventional coating techniques to produce adhesive-coated materials. Flexible substrates are defined herein as any material which is conventionally utilized as a tape backing or may be of any other flexible material. Examples include, but are not limited to plastic films such as polypropylene, polyethylene, polyvinyl chloride, polyester (polyethylene terephthalate), polycarbonate, polymethyl(meth)acrylate (PMMA), cellulose acetate, cellulose triacetate, and ethyl cellulose. Foam backings may be used. Examples of inflexible substrates include, but are not limited to, metal, metallized polymeric film, indium tin oxide coated glass and polyester, PMMA plate, polycarbonate plate, glass, or ceramic sheet material. The adhesive-coated sheet materials may take the form of any article conventionally known to be utilized with adhesive compositions such as labels, tapes, signs, covers, marking indices, display components, touch panels, and the like. Flexible backing materials having microreplicated surfaces are also contemplated.

The above-described compositions are coated on a substrate using conventional coating techniques modified as appropriate to the particular substrate. For example, these compositions can be applied to a variety of solid substrates by methods such as roller coating, flow coating, dip coating, spin coating, spray coating, knife coating, and die coating. These various methods of coating allow the compositions to be placed on the substrate at variable thicknesses thus allowing a wider range of use of the compositions. Coating thicknesses may vary, but coating thicknesses of 2-500 microns (dry thickness), preferably about 25 to 250 microns, are contemplated.

The adhesives of the present disclosure are particularly useful for forming strong bonds to low surface energy (LSE) substrates. As used herein, low surface energy substrates are those having a surface energy of less than about 45 dynes per centimeter, more typically less than about 40 dynes per centimeter, and most typically less than about 35 dynes per centimeter. Included among such materials are olefin-based thermoplastics (polypropylene, polyethylene, high density polyethylene or HDPE, ethylene propylene diene monomer rubber (EPDM)), as well as polystyrene and poly(methyl methacrylate) (PMMA). Such material as commonly used in automotives, paints, appliances and electronics markets. Other substrates may also have properties of low surface energy due to a residue, such as an oil residue or a film such as paint, being on the surface of the substrate. However, even though the present adhesive bonds well to low surface energy surfaces, the invention is not limited to being bonded to low surface energy substrates, as it has been found that the inventive adhesive can also bond well to higher surface energy substrates such as, for example, other plastics, ceramics, glass and metals. The adhesive compositions described herein are also suitable for the medical adhesive field due to having low odor and being physiologically inert.

The pressure sensitive adhesive can exhibit various peel and shear properties, depending on the intended end use.

In some embodiments the 90 degree peel to glass, stainless steel, high density polyethylene (HDPE), polypropylene (PP), or EPDM thermoplastic elastomer is at least 5 oz/inch (5 N/dm) for a temporary removable or low temperature PSA. For masking tapes, the 90 degree peel to glass, stainless steel, HDPE, PP, or TPE is typically 15-20 oz/inch (16-22 N/dm). In some favored embodiments, the adhesive exhibits good adhesion to both high and low surface energy substrates. In some embodiments the 90 degree peel to glass, stainless steel EPDM or PP is independently at least 25, 30, 35, 40, 45, or 50 oz/inch. In at least some embodiments, the shear at room temperature (23° C.) is at least 300 minutes, 500 minutes, or 800 minutes. In some favored embodiment, the shear at room temperature (23° C.) or 70° C. is at least 2,000 minutes; 4,000 minutes; 8,000 minutes; or 10,000 minutes.

The substrate (to which the PSA is bonded) is selected depending on the particular application in which it is to be used. For example, the adhesive can be applied to sheeting products, (e.g., decorative graphics and reflective products), label stock, and tape backings. Additionally, the adhesive may be applied directly onto a substrate such as an automotive panel, or a glass window so that another substrate or object can be attached to the panel or window.

The adhesive can also be provided in the form of a pressure-sensitive adhesive transfer tape in which at least one layer of the adhesive is disposed on a release liner for application to a permanent substrate at a later time. The adhesive can also be provided as a single-coated or double-coated tape in which the adhesive is disposed on a permanent backing. Backings can be made from plastics (e.g., polypropylene, including biaxially oriented polypropylene, vinyl, polyethylene, polyester such as polyethylene terephthalate), nonwovens (e.g., papers, cloths, nonwoven scrims), metal foils, foams (e.g., polyacrylic, polyethylene, polyurethane, neoprene), and the like. Foams are commercially available from various suppliers such as 3M Co., Voltek, Sekisui, and others. The foam may be formed as a coextruded sheet with the adhesive on one or both sides of the foam, or the adhesive may be laminated to it. When the adhesive is laminated to a foam, it may be desirable to treat the surface to improve the adhesion of the adhesive to the foam or to any of the other types of backings. Such treatments are typically selected based on the nature of the materials of the adhesive and of the foam or backing and include primers and surface modifications (e.g., corona treatment, surface abrasion). Additional tape constructions include those described in U.S. Pat. No. 5,602,221 (Bennett et al.), incorporated herein by reference.

For a single-sided tape, the side of the backing surface opposite that where the adhesive is disposed is typically coated with a suitable release material. Release materials are known and include materials such as, for example, silicone, polyethylene, polycarbamate, polyacrylics, and the like. For double coated tapes, another layer of adhesive is disposed on the backing surface opposite that where the adhesive of the invention is disposed. The other layer of adhesive can be different from the adhesive of the invention, e.g., a conventional acrylic PSA, or it can be the same adhesive as the invention, with the same or a different formulation. Double coated tapes are typically carried on a release liner.

The following, non-limiting, examples further describe exemplary adhesives and adhesive articles of the present disclosure, as well as exemplary methods for making such adhesives and adhesive articles.

EXAMPLES

As used in the examples, pph refers to parts per hundred parts of the polymer. One hundred parts of polymer includes the total amount of quaternary amine modified polyisobutylene polymer and any unfunctionalized polyisobutylene, e.g., MWPIB.

Test Methods:
90° Angle Peel Adhesion Strength Test.

Peel adhesion strength was measured at a 90° angle using an IMASS SP-200 slip/peel tester (available from IMASS, Inc., Accord Mass.) at a peel rate of 305 mm/minute (12 inches/minute) using the procedure described in ASTM International standard, D3330, Method F. Test panels were prepared by wiping the panels with a tissue wetted with the corresponding solvents shown in Table 1 using heavy hand pressure to wipe the panel 8-10 times. This procedure was repeated two more times with clean tissues wetted with solvent. The cleaned panel was allowed to dry. The adhesive tape was cut into strips measuring 1.27 cm×20 cm (½ in.×8 in.) and the strips were rolled down onto the cleaned panel with a 2.0 kg (4.5 lb.) rubber roller using 2 passes. The prepared samples were stored at 23° C./50% RH for 24 hours before testing. Two samples were tested for each example and averaged values were expressed in N/dm. Failure mode was noted and recorded as COH—cohesive, i.e., the adhesive split leaving residue on both the tape and test surface, ADH—adhesive, i.e., the adhesive peeled cleanly from the test surface, and MIX—the adhesive peeled cleanly from some areas and adhered to the surface in other areas.

TABLE 1

| Peel Adhesion Test Panel Materials | |
|---|---|
| Material | Solvent |
| HDPE—High density polyethylene | Isopropyl alcohol |
| PP—Polypropylene | Isopropyl alcohol |
| Thermoplastic Elastomer (TPE) based on EPDM and polypropylene | Isopropyl alcohol |
| SS—Stainless Steel | Heptane |
| Glass—Soda-lime glass | Heptane |

Static Shear Strength

The static shear strength was evaluated as described in the ASTM International standard, D3654, Procedure A at 23° C./50% RH (relative humidity) using a 1000 g load. Tape test samples measuring 1.27 cm×15.24 cm (½ in.×6 in.) were adhered to 1.5 inch by 2 inch stainless steel (SS) panels using the method to clean the panel and adhere the tape described in the peel adhesion test. The tape overlapped the panel by 1.27 cm×2.5 cm. and the strip was folded over itself on the adhesive side, and then folded again. A hook was hung in the second fold and secured by stapling the tape above the hook. The weight was attached to the hook and the panels were hung in a 23° C./50% RH room. The time to failure in minutes was recorded. If no failure was observed after 10,000 minutes, the test was stopped and a value of 10,000 minutes was recorded. The mode of failure described in the peel adhesion test was also noted.

Materials Used for Examples
BPIB—copolymer of isobutylene and brominated isoprene (Lanxess Bromobutyl 2030, Lanxess Corporation; Akron, Ohio)
LPIB—low molecular weight (1K g/mol) liquid polyisobutylene (Glissopal 1000, Plasticizer, BASF; Florham Park, N.J.)
TACKIFIER—cycloaliphatic hydrocarbon based tackifier (ESCOREZ 5340 tackifier, ExxonMobil Corporation; Baytown, Tex.) MWPIB—unfunctionalized, medium molecular weight (80K g/mol) polyisobutylene (OPPA- NOL B15 polymer, BASF; Florham Park, N.J.) Hostaphan® 3SAB—primed polyester film (Mitsubishi, Greer, S.C.)

Crosslinker (2,4-bis-trichloromethyl-6(3,4-dimethoxyphenyl)-S-triazine) which can be prepared according to Wakabayashi et al., *Bull. Chem. Soc. Jap.*, Vol. 42, pages 2924-2930 (1969)).

Solvents including isopropyl alcohol, heptane, and acetone (Sigma Aldrich, St. Louis, Mo.)

Toluene—99.5%, (EMD, Gibbstown, N.J.)

Tertiary Amines 2-(Dimethylamino)ethyl methacrylate (TCI America, Portland, Oreg.)

N-[3-(Dimethylamino)propyl]acrylamide (TCI America, Portland, Oreg.)

3-(Dimethylamino)propyl acrylate (TCI America, Portland, Oreg.)

3-Dimethylamino neopentyl acrylate (Polysciences, Warrington, Pa.)

Preparation of 3-(Dimethylamino)propyl acrylate grafted PIB (Polymer 1)

In a three-neck, round-bottomed flask equipped with a reflux condenser, thermometer, and a nitrogen inlet was placed Lanxess Bromobutyl 2030 copolymer (20.0 g), 3-(dimethylamino)propyl acrylate (1.0 g), and toluene (80.0 g). The contents of the flask were stirred with a magnetic stir bar under nitrogen atmosphere at room temperature. Once all the components completely dissolved, the flask was heated to 105° C. After 5 hours, the reaction was cooled to room temperature. The solution was poured into acetone to coagulate the modified polymer. The isolated polymer was washed with fresh acetone three times to remove the reaction solvent and the unreacted reactant. The polymer was then filtered and was dried in a vacuum oven for 12 hours at 50° C., and then cooled to room temperature.

Preparation of 3-dimethylamino neopentyl acrylate grafted PIB (Polymer 2)

Polymer 2 was synthesized by following the procedure in Polymer 1 except 2,3-dimethylamino neopentyl acrylate was used instead of 3-(dimethylamino)propyl acrylate.

Preparation of 2-(dimethylamino)ethyl methacrylate grafted PIB (Polymer 3)

Polymer 3 was synthesized by following the procedure in Polymer 1 except 3,2-(dimethylamino)ethyl methacrylate was used instead of 3-(dimethylamino)propyl acrylate.

Preparation of N-[3-(dimethylamino)propyl]acrylamide grafted PIB (Polymer 4)

Polymer 4 was synthesized by following the procedure in Polymer 1 except N-[3-(dimethylamino)propyl]acrylamide was used instead of 3-(dimethylamino)propyl acrylate.

Examples 1-2 and Control Compositions C1-C2

Adhesive compositions were prepared by mixing a modified polymer (Polymer 1), or a copolymer of brominated isobutylene (BPIB) for C1 and C1, and optional unfunctionalized medium molecular weight polyisobutylene (MWPIB), tackifier (of ESCOREZ 5340) and crosslinker (2,4-bis-trichloromethyl-6(3,4-dimethoxy-phenyl)-S-triazine) in the amounts shown in Table 2 in 100 mL jars containing 400 parts of toluene. The jars were mixed on a roller mill overnight.

TABLE 2

| | Adhesive Compositions | | | | |
|---|---|---|---|---|---|
| Ex | Polymer 1 (parts) | BPIB (parts) | MWPIB (Parts) | Tackifier (pph) | Crosslinker (pph) |
| 1 | 100 | 0 | 0 | 20 | 0.2 |
| 2 | 70 | 0 | 30 | 20 | 0.2 |
| C1 | | 100 | 0 | 20 | 0 |
| C2 | | 70 | 30 | 20 | 0 |

The resulting compositions were knife-coated onto the primed side of a 6 inch by 25 inch strip of polyester film backing (Hostaphan® 3SAB) to a thickness of about 15 mils wet. The coated film was dried in an oven set at 70° C. for 20 minutes to provide a tape having an adhesive coating thickness of 2 mils. The coated tapes were cured by irradiating with UV light (400 mJ/cm2, UVB) using a UV processor (Fusion UV System, Inc., Gaithersburg, Md.).

The tapes were conditioned at 23° C., 50% RH for 24 hours before testing for 90° Peel Adhesion and shear strength at room temperature (RT Shear). Test results are shown in Table 3.

TABLE 3

| | Adhesive Properties | | | | | | | |
|---|---|---|---|---|---|---|---|---|
| | 90° Peel Adhesion [oz/inch (N/dm)] | | | | | | Shear | |
| Ex | HDPE | PP | TPE | SS | Glass | Failure | (min) | Failure |
| 1 | 12(13) | 41(45) | 42(46) | 35(38) | 37(40) | ADH | 10000 | None |
| 2 | 14(15) | 42(46) | 46(50) | 35(38) | 38(42) | ADH | 10000 | None |
| C1 | 5(5) | 6(7) | 67(73) | 26(28) | 23(25) | MIX | 835 | COH |
| C2 | 15(16) | 52(57) | 97(106) | 47(51) | 35(38) | COH | 157 | COH |

Examples 3-8

Adhesive compositions and tape were prepared as described in Examples 1-2, except that the modified PIBs were Polymer 2, 3, and 4. Adhesion compositions are shown in Table 5. Test results for room temperature and 90° peel adhesion are shown in Table 6.

TABLE 5

Adhesive Compositions

| Ex | Polymer | (parts) | MWPIB (pph) | Tackifier (pph) | Crosslinker (pph) |
|---|---|---|---|---|---|
| 3 | Polymer 2 | 100 | 0 | 20 | 0.2 |
| 4 | Polymer 2 | 70 | 30 | 20 | 0.2 |
| 5 | Polymer 3 | 100 | 0 | 20 | 0.2 |
| 6 | Polymer 3 | 70 | 30 | 20 | 0.2 |
| 7 | Polymer 4 | 100 | 0 | 20 | 0.2 |
| 8 | Polymer 4 | 70 | 30 | 20 | 0.2 |

TABLE 6

Tape Adhesive Properties with Polymer 2-4

| | Shear | | 90° Peel Adhesion [oz/inch (N/dm)] | | | | |
|---|---|---|---|---|---|---|---|
| Ex | (min) | Failure | HDPE | PP | TPE | SS | Glass | Failure |
| 3 | 10000 | None | 11(12) | 48(53) | 39(43) | 44(48) | 46(50) | ADH |
| 4 | 10000 | None | 16(17) | 49(54) | 46(50) | 44(48) | 49(54) | ADH |
| 5 | 10000 | None | 14(15) | 36(39) | 38(42) | 34(37) | 27(30) | ADH |
| 6 | 9700 | COH | 15(16) | 45(49) | 46(50) | 38(42) | 32(35) | ADH |
| 7 | 10000 | None | 7(8) | 36(39) | 10(11) | 36(39) | 31(34) | ADH |
| 8 | 10000 | None | 12(13) | 44(48) | 23(25) | 40(44) | 37(40) | ADH |

Hot melt (solventless) adhesive compositions and tapes were prepared as described in Examples 9-10. The compositions were made by mixing a copolymer of brominated isobutylene (BPIB), unfunctionalized medium molecular weight polyisobutylene (MWPIB), 2-(dimethylamino)ethyl methacrylate, crosslinker (2,4-bis-trichloromethyl-6(3,4-dimethoxy-phenyl)-S-triazine), low molecular weight liquid polyisobutylene (LPIB), and tackifier (of ESCOREZ 5340) in the amounts shown in Table 7.

The mixing was conducted in a Brabender mixer (C.W. Brabender® Instruments, Inc South Hackensack, N.J.) at 100° C. Typical mixing time was 5-10 min.

TABLE 7

Adhesive Compositions

| Ex | BPIB (parts) | MWPIB (parts) | 2-(dimethylamino) ethyl methacrylate (pph) | LPIB (pph) | Tackifier (pph) | Crosslinker (pph) |
|---|---|---|---|---|---|---|
| 9 | 70 | 30 | 1 | 5 | 20 | 0.2 |
| 10 | 70 | 30 | 1 | | | 0.2 |

The prepared adhesive compositions were then hot-pressed onto the primed side of a 6 inch by 25 inch strip of polyester film backing (Hostaphan® 3SAB) to a thickness of about 5 mils at 170° C. The coated tapes were cured by irradiating with UV light (400 mJ/cm2, UVB) using a UV processor (Fusion UV System, Inc., Gaithersburg, Md.). Test results are shown in Table 8.

TABLE 8

Tape Adhesive Properties

| | RTShear | | 90° Peel Adhesion [oz/inch (N/dm)] | | | |
|---|---|---|---|---|---|---|
| Ex | (min) | Failure | PP | SS | Glass | Failure |
| 9 | 7350 | cohesive | 37(40) | 28(31) | 32(35) | ADH |
| 10 | 10000 | None | 32(35) | 24(26) | 30(33) | ADH |

What is claimed is:

1. An adhesive composition comprising a copolymer of isobutylene repeat units and alkene repeat units derived from isoprene, butadiene, or a combination thereof;

wherein at least a portion of the alkene repeat units are bonded to a pendent nitrogen atom of a quaternary ammonium salt comprising a free-radically polymerizable substituent, wherein the copolymer is of the formula

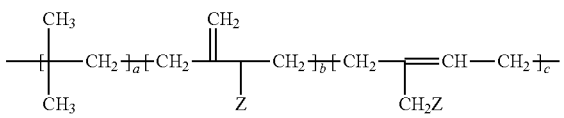

wherein a is at least 20, the sum of b and c is at least one, and Z is a quaternary ammonium salt group comprising a free-radically polymerizable substituent, and optionally a tackifier.

2. The adhesive composition of claim 1 comprising greater than 0% by weight but less than 20% by weight of alkene repeat units bonded to the nitrogen atom of the quaternary amine salt group.

3. The adhesive composition of claim 1, wherein the quaternary ammonium salt group, Z, is of the formula:

$$-^+(NR^2R^3R^4)(X^2)^- \text{ or}$$

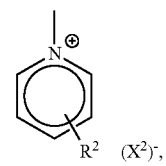

where $R^2$ comprises a free-radically polymerizable group, and each of $R^3$ and $R^4$ are independently a $C_1$-$C_{18}$ alkyl; and $X^2$ is halogen.

4. The adhesive composition of claim 1 wherein the free-radically polymerizable group or $R^2$ is a (meth)acrylate or (meth)acrylamide group.

5. The adhesive composition of claim 1 wherein the copolymer has a molecular weight (Mw) of 50,000 to 5,000,000.

6. The adhesive composition of claim 5 wherein the copolymer has a molecular weight (Mw) no greater than 1,000,000 g/mole.

7. The adhesive composition of claim 1 further comprising a photocrosslinking agent.

8. The adhesive composition of claim 7 wherein the photocrosslinking agent is selected from aldehydes, ketones, quinones, thioxanthones and chromophore-substituted vinyl halomethyl-s-triazines photocrosslinking agents.

9. The adhesive composition of claim 1 further comprising 5 to 50 wt.-% of tackifier.

10. The adhesive composition of claim 1 further comprising 5 to 50 wt.-% of an unfunctionalized polyisobutylene polymer.

11. The adhesive composition of claim 10 wherein the unfunctionalized polyisobutylene polymer has a molecular weight no greater than 100,000 g/mole.

12. The adhesive composition of claim 1 further comprising a plasticizer.

13. The adhesive composition of claim 1 wherein the adhesive is a hot-melt adhesive.

14. A crosslinked adhesive composition of claim 1.

15. An adhesive article comprising the adhesive of claim 14 on a backing.

16. An adhesive article comprising the adhesive of claim 1 on a backing.

17. The adhesive of claim 1 wherein b is at least one.

18. The adhesive of claim 17 wherein c is zero.

* * * * *

UNITED STATES PATENT AND TRADEMARK OFFICE
CERTIFICATE OF CORRECTION

PATENT NO. : 9,562,180 B2
APPLICATION NO. : 14/354998
DATED : February 7, 2017
INVENTOR(S) : Hae-Seung Lee It is certified that error appears in the above-identified patent and that said Letters Patent is hereby corrected as shown below:

In the Specification

Column 2
Line 26-27, Delete "paramethylsytrene," and insert -- paramethylstyrene, --, therefor.
Line 35, Delete "paramethylsytrene" and insert -- paramethylstyrene --, therefor.

Column 3
Lines 30-35,

Delete " ... " and insert --

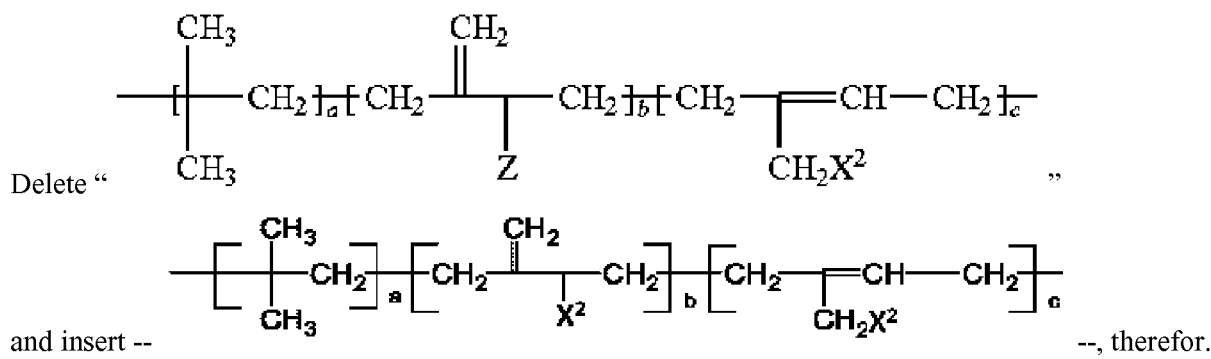

--, therefor.

In the Claims

Column 16
Line 54, delete "amine" and insert -- ammonium --.

Signed and Sealed this
First Day of August, 2017

Joseph Matal
Performing the Functions and Duties of the
Under Secretary of Commerce for Intellectual Property and
Director of the United States Patent and Trademark Office